United States Patent [19]

Wagner et al.

[11] 4,209,337
[45] Jun. 24, 1980

[54] PREPARATION OF HARDENABLE BINDING AGENTS BASED ON CEMENT AND BITUMINOUS EMULSIONS

[75] Inventors: Helmut Wagner, Ketsch; Fritz Hess, Mannheim, both of Fed. Rep. of Germany

[73] Assignee: Th. Goldschmidt AG, Essen, Fed. Rep. of Germany

[21] Appl. No.: 15,643

[22] Filed: Feb. 27, 1979

[30] Foreign Application Priority Data

Mar. 6, 1978 [DE] Fed. Rep. of Germany ....... 2809537

[51] Int. Cl.² ............................................. C04B 7/356
[52] U.S. Cl. ................................. 106/96; 106/273 N; 106/277; 106/281 R
[58] Field of Search ................ 106/96, 273 N, 277, 106/281 R

[56] References Cited

U.S. PATENT DOCUMENTS

| 2,067,772 | 1/1937 | Levin | 106/27 |
|---|---|---|---|
| 2,468,012 | 4/1949 | Isbell | 260/534 |
| 2,483,806 | 10/1949 | Buckley et al. | 106/96 |
| 3,126,292 | 3/1964 | Bottero et al. | 106/277 |

FOREIGN PATENT DOCUMENTS 1180300 10/1964 Fed. Rep. of Germany .

OTHER PUBLICATIONS

Goldschmidt, A.G., "Bituminous Road Emulsions", Chem. Abstracts 62, 2658g (1965).

*Primary Examiner*—Earl A. Nielsen
*Attorney, Agent, or Firm*—Toren, McGeady and Stanger

[57] ABSTRACT

Hardenable binding agents which are composed of cement and emulsions of bituminous products wherein the emulsifier is a surface-active betaine. This composition is particularly suitable for use in roadway surfaces because it possesses both excellent elastic behavior as well as good mechanical properties. Methods for the preparation of the material and the composition are also disclosed.

12 Claims, No Drawings

PREPARATION OF HARDENABLE BINDING AGENTS BASED ON CEMENT AND BITUMINOUS EMULSIONS

BACKGROUND OF THE INVENTION

1. Field of the Invention

The invention relates to a process for the preparation of hardenable binding agents based on cement with the addition of emulsions of bituminous products and, if desired, synthetic materials. These binders may be used for the production of roadway surfaces as well as flexible bases for supporting asphalt or concrete roadway surfaces and for the manufacture of floor finishes as well as of cast objects in the form of pipes, blocks or panels.

2. Description of the Prior Art

As used herein, bituminous products are understood to refer particularly to bitumens, tars, pitch and resins, such as, those obtained for mineral oil and coal by known procedures through distillation or extraction. Bitumens, however, are preferred. Bitumens with a penetration number of 10 to 300 are especially preferred.

It is well known that roadway surfaces may be prepared from bituminous raw materials which have been mixed with mineral fillers, such as, fine gravel, for example. Such roadway surfaces have viscoelastic properties. Under high loads and particularly at elevated temperatures, they tend to permanently deform.

It is also well known that roadway surfaces based on cement concrete may be prepared. These roadway surfaces are distinguished by their hardness and by their load carrying capacity. The inelastic, rigid behavior of these cement-based surfaces is, however, a disadvantage because of the difficulty of repairing such roadway surfaces in the case of damage.

There have been numerous attempts to combine the viscoelastic properties of bitumen/asphalt concrete and asphalt roadway surfaces with the good mechanical properties of roadway surfaces based on cement concrete by adding to the cement, before it sets, aqueous emulsions of bituminous products to which dispersions of synthetic materials may also be added. The bituminous products, referred to in the following as bitumen, are intended to envelope the cement particles completely or partially and, in so doing, totally or partially prevent the formation of bonds between the mineral particles as the cement sets. Admittedly, cement-based products are obtained, whose elastic behavior may be influenced by the nature, quantity and distribution of the bitumen introduced, so that the mechanical properties may be adjusted at will from the rigid to the elastic state.

In German Offenlegungsschrift No. 26 13 075, a rapidly setting mixture is described which is characterized by the fact that it contains an extremely rapidly setting cement with a content of $11CaO.7Al_2O_3.CaX_2$, in which X is a halogen atom, $3CaO.SiO_2$ and $CaSO_4$ as essential components, at least one short-range strength accelerator from the group of calcium aluminates, limes, amines and ethylene glycols, as well as calcium sulfate hemihydrate, at least one emulsion from the group of bituminous emulsions, rubber latexes and resin emulsions and 12 to 50 weight percent of water, based on the total mixture. The bitumen emulsion is characterized by the type of emulsifier used therein and may be a cationic, anionic or nonionic emulsion or an emulsion of the clay type and should contain, for each part by weight of cement, 0.02 to 3 parts by weight and, preferably, 0.15 to 1.5 parts by weight of the emulsion, the parts by weight referring to the nonvolatile components. The bituminous emulsions generally contain 40 to 70 weight percent of bituminous material. The penetration number of the residue obtained from concentrating the bituminous emulsion by evaporation generally is from 10 to 300 at 25° C.

Incompatibility in the mixture is frequently observed on the addition of its aqueous suspension. An aqueous suspension of cement is highly alkaline and has a high cation content. When using an emulsion which has been prepared with an anionic emulsifier, this may lead to precipitation of the emulsifier and to an uncontrolled breaking of the bitumen emulsion. This, in turn, causes an uncontrolled deposition of bitumen particles in the hardened cement and prevents the desired total or partial envelopment of the individual cement particles by bitumen.

On the other hand, emulsions prepared with cationic emulsifiers, whose preferred stability range lies in the acid pH region, break because of the change in the pH value on addition of the cement suspension. With nonionic emulsifiers and with anionic emulsifiers based on sulfates or sulfonates, it is possible to prepare bitumen emulsions which have the advantage of a certain insensitivity to changes in the pH and towards the alkaline earth ions of the cement. However, it is not possible to control the rate of breaking of such emulsions. On mixing with minerals, they undergo heavy foaming and the unbroken emulsion is leached out when a finished coating is exposed to rain before it has fully dried out and set.

Moreover, it is well-known that emulsions containing ionic emulsifiers can be stabilized towards cement by the addition of water soluble colloids, such as, protein degradation products or cellulose ethers or by mixing with swellable minerals, such as, bentonite. The bituminous binding agents may also be emulsified directly in aqueous suspensions of such products. Admittedly, emulsions so prepared are compatible with cement. However, coatings and molded articles prepared with such emulsions tend to form shrinkage cracks on setting as a result of the drying out of the swellable substances contained in these emulsions.

SUMMARY OF THE INVENTION

We have discovered bitumen emulsions which are stable in the presence of cement or an aqueous suspension of cement for a specified period of time fixed by the preparation and processing of the material. Additionally, the breaking behavior of these emulsions can be controlled in the manner desired, for example, by selecting the suitable emulsifier concentration, to correspond to the requirements of the particular end use. In this manner, the bitumen emulsions envelope the cement particles as uniformly as possible before the cement particles set and the coarse distribution of the bitumen in the cement matrix in the form of droplets or a coagulate can be avoided.

Specifically, we have discovered that these objects can be achieved when emulsions of bituminous products which contain surface-active betaines as the emulsifiers are used.

Betaines of the general formula $$R^1CO-NH-R^2-\overset{R^3}{\underset{R^4}{\overset{|}{\underset{|}{N^\oplus}}}}-R^5-COO^\ominus$$

are used as emulsifiers. In this formula, $R^1$ preferably represents a linear, aliphatic hydrocarbon residue with 8 to 22 carbon atoms or a cycloaliphatic hydrocarbon residue.

$R^2$ is a bivalent hydrocarbon residue with 2 to 6 carbon atoms, which preferably is linear. They ethylene and propylene residues are especially preferred.

$R^3$ and $R^4$ are the same or different and represent a monovalent hydrocarbon residue with 1 to 4 carbon atoms, especially the methyl residue.

$R^5$ is a bivalent hydrocarbon residue with 1 to 4 carbon atoms, preferably the methylene or ethylene residue.

DESCRIPTION OF THE PREFERRED EMBODIMENT

Surface-active betaines for the preparation of bitumen emulsions are known and described, for example, in German Pat. No. 1,180,300. It could not, however, have been expected that bitumen emulsions, prepared with surface-active betaines, are stable even in the presence of alkaline cement suspensions for the period of time required by the use and application of such suspensions. German Pat. No. 1,180,300 discloses the pH of emulsions, prepared with such betaines, should be in the vicinity of the isoelectric point of the betaines. The isoelectric point of betaines usually, however, lies in the neutral to weakly acidic region, while the cement suspensions have a pH range of about 12 to 13.

It was moreover surprising that the breaking behavior of emulsions containing betaine emulsifiers could be controlled within wide limits by the choice of the concentration of the emulsifier and the pH of the emulsion to which the emulsifier is to be added. The importance of this desired ability to control the breaking behavior is evident from the fact that, for example, while building up a street surface, the temperature of the street to be covered as well as the outside temperature may change during the course of the day, as a result of which the processing time of the binding agent, e.g., the setting time of the cement, and the breaking time of the emulsion are affected. This breaking time can now be adapted to the processing conditions by suitably adjusting the concentration of the emulsifier and/or the pH of the bitumen emulsion, so that the desired result can be achieved with safety.

At the same time, the emulsifier content of the bitumen emulsion may be varied within the limits of about 0.2 to 5 weight percent of the total emulsion. In particular, during use, the concentration lies within a range from 1 to 3 weight percent. The stability of the emulsion towards the cement slurry increases with increasing emulsifier content. Moreover, the bitumen content of the emulsion is between 30 and 70 and especially between 50 and 65 weight percent, based on the total emulsion. The pH of the emulsion can be adjusted to any desired value between about 1.5 and 10 by the addition of acid or caustic. Emulsions having a pH of 5 to 9, particularly, 5 to 8, are preferred.

It is well known that surface-active betaines are characterized by the fact that they are able to form an internal salt and have a hydrophobic residue which is responsible for the surface activity. The compounds contain as the hydrophilic residue at least one quaternary ammonium group, which is able to interact intramolecularly with an acid group, preferably with a carboxyl group, to form an internal salt. The groups derived from the oxygen acids of sulfur or phosphorus are also suitable as acid groups. The hydrophobic residue usually is a fatty alkyl residue with 8 to 22 carbon atoms. It may also be a naphthenyl residue, derived from naphthenic acid, or a cycloaliphatic hydrocarbon residue.

Examples of particular betaines suitable for use in the present invention are:

stearoyl-1,3-amidopropyl-dimethylaminoacetic acid betaine

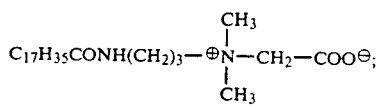

oleyl-1,2-amidoethyldiethylaminoacetic acid betaine

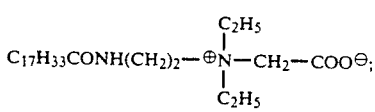

alkanoyl-1,2-amidoethyldiethylaminopropionic acid betaine, in which the alkanoyl residue is derived from coconut oil fatty acids

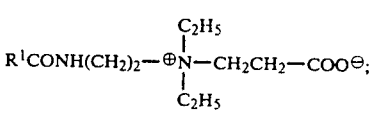

myristoyl-1,4-amido-1-methylbutyldiethylaminoacetic acid betaine

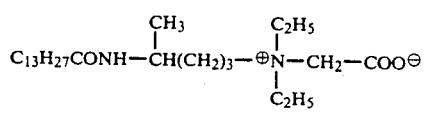

lauroyl-1,3-amidopropyldimethylaminopropionic acid betaine

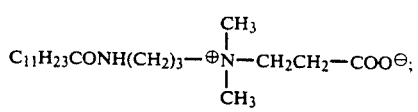

palmitoyl-1,2-amidoethyldimethylaminoacetic acid betaine

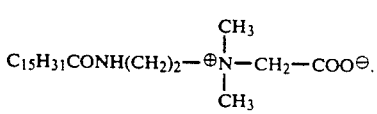

Further suitable betaines are those having the formula

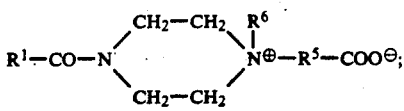

in which $R^1$ and $R^5$ have the meanings already given, and $R^6$ is a monovalent hydrocarbon residue with 1 to 4 carbon atoms, and is especially the methyl residue.

Examples of such betaines are:
1-methyl-1-carboxymethyl-4-alkanoylamidopiperazinium betaine, in which $R^1$ is derived from tallow fatty acids

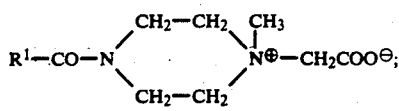

1-ethyl-1-carboxyethyl-4-alkanoylamidopiperazinium betaine, in which $R^1$ is derived from tall oil fatty acids

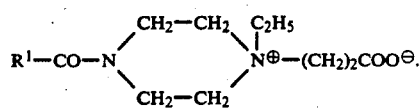

A further example of a suitable betaine is a betaine having the following formula:

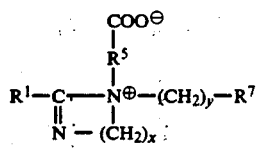

wherein
$R^1$ and $R^5$ have the meaning given hereinabove,
$R^7$ is hydrogen, an alkyl residue or a hydroxyl group,
x has a value of 2 or 3, and
y a value of 1 or 2.

Examples of such betaines are:
1-methyl-1-carboxymethyl-2-oleylimidazolinium betaine

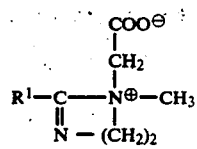

$R^1$ = oleyl residue
1-hydroxyethyl-1-carboxyethyl-2-laurylimidazolinium betaine

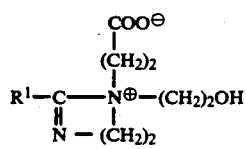

$R^1$ = lauryl residue
1-methyl-1-carboxymethyl-2-stearyltetrahydropyrimidinium betaine

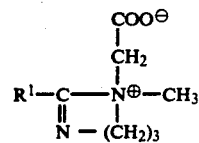

$R^1$ = stearyl residue
1-hydroxyethyl-1-carboxyethyl-2-palmityltetrahydropyrimidinium betaine

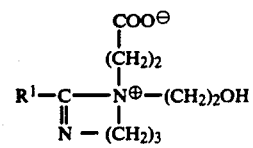

$R^1$ = palmityl residue

The synthesis of betaines is known and described in many references, inter alia, in "Surface Active Agents", Interscience Publishers Inc., 1949, pages 218 ff.

In order to avoid incompatibility, the presence of cationic or anionic groups in addition to the betaine structure should be avoided.

The emulsions of bituminous products, which are to be used in accordance with the invention, are compatible with the customary additives used for cement. The task of such additives is to affect the setting time of the cement with respect to acceleration, retardation or fluidization of the cement-water mixture as a result of which these mixtures become pumpable or can be processed with a decreased water content. Other additives are intended to promote pore formation. Examples of such additives are borates, phosphates, fluorosilicates, halides, carbonates, bicarbonates, silicates and aluminates. Sugars, hydrocarboxylic acids and their salts, lignin sulfonates, alkylaryl sulfonates, resin soaps and melamine resins in particular are examples of organic additives.

The addition of dispersions of synthetic materials to cement is also well known. Such dispersions of synthetic materials are mentioned, for example, in German Offenlegungsschrift No. 26 13 075. Examples of dispersions of such synthetic materials are dispersions of rubber, in which natural rubber, styrene-butadiene rubber, butyl rubber, acrylonitrile-butadiene rubber or chloroprene rubber may be used. Other polymeric synthetic materials are polyvinyl acetate, ethylene/vinyl acetate copolymers, polyvinylidene chloride, and polyacrylic esters. Alkyd resins are also used as modifying agents. The dispersions of synthetic materials have an effect on the tensile and bending strengths of the set cement and may also improve the adhesion of the cement to the substrate.

In respect to the state of the art dealing with additives and auxiliaries, reference is made to the book "Zusatzmittel, Anstrichstoffe, Hilfsstoffe für Beton und Mörtel" (Additives, Paints, Auxiliaries for Concrete and Mortar) by Albrecht and Mannherz, Bau-Verlag GmbH, Wiesbaden and Berlin, 1968, as well as to the reports of the "Forschungsgesellschaft für Strassenwesen" (Research Society for Street Systems) by Zenke concerning polymer-modified road-construction bitumen, which appeard in 1976 and 1977.

The emulsions of bituminous products, which are to be used in accordance with the invention, are, as a rule, also compatible with such dispersions of synthetic materials. The bituminous emulsions and the dispersions of synthetic materials may, therefore, be added to the cement-water system separately or together.

The preparation of the bitumen emulsions, their behavior towards cement slurries, as well as the outward appearance of the set cement-based binding agent is described in the following examples.

1. Preparation of the Bitumen Emulsion

The bitumen emulsion was prepared in 1 kg batches. For this purpose, the emulsifier used was dissolved in water at 80° C., the pH was adjusted to the desired value with acid or alkali depending on the type of emulsion. The bitumen used was heated to 120° C. and fed continuously into the solution of the emulsifier with the help of a high-performance dispersing device (of the "Ultra-Turrax T 45" type from the Janke & Kunkel Co.) with a generator speed of 10,000 rpm. When this process was completed, it was followed for a total period of 5 minutes by the post-emulsifying process. The finished emulsion was then cooled to a temperature below 30° C.

Various emulsions of bituminous products within and without the scope of the present invention, were prepared according to these directions. The charge on the disperse phase was determined by electrophoresis. Accordingly, the charge on the particles and therefore the character of the emulsion was described as cationic, when the dispersed particles migrated towards the cathode during electrophoresis. When the disperse phase was anionic, the particles were charged negatively and migrated to the anode. If migration towards an electrode could not be detected under the conditions of electrophoresis, the emulsion was described as neutral.

The following emulsifiers were used: emulsifiers I to III are in accordance with the present invention, and emulsifiers IV to X are not.

Emulsifier I = alkanoyl-1,3-amidopropyl-1-dimethylaminoacetic acid betaine
(the alkanoyl residue is derived from a mixture of natural fatty acids from coconut oil)

Emuslifier II = 1-methyl-1-carboxymethyl-4-alkanoylamidopiperazinium betaine
(the alkanoyl residue is derived from a mixture of natural fatty acids from coconut oil)

Emulsifier III = 1-methyl-1-carboxymethyl-2-alkanoylimidazolinium betaine
(the alkanoyl residue is derived from a mixture of natural fatty acids from coconut oil)

Emulsifier IV = potassium soaps of tall oil fatty acids
(anionic)

Emulsifier V = stearoyl-1,3-amidopropyltrimethylammonium chloride
(cationic)

Emulsifier VI = stearoyl-1,3-amidopropyldimethylamine
(cationic)

Emulsifier VII = a mixture of tallow fatty polyamines of different chain lengths
(cationic)

Emulsifier VIII = polyoxyethylene-sorbitan monooleate
(nonionic)

Emulsifier IX = polyoxyethylene-alkylaryl ether
(nonionic)

Emulsifier X = clay (clay type).

| | Emulsifier | Formulation | Bitumen B 200 weight % | Emulsifier weight % | pH | Charge on the disperse phase |
|---|---|---|---|---|---|---|
| | I | 1.1 | 50 | 0.90 | 2.4 | cationic |
| | | 1.2 | 50 | 0.90 | 6.1 | neutral |
| | | 1.3 | 50 | 0.90 | 8.2 | anionic |
| | | 1.4 | 50 | 0.30 | 6.7 | neutral |
| according to the invention | | 1.5 | 50 | 1.50 | 6.6 | neutral |
| | II | 2.1 | 50 | 0.90 | 5.7 | neutral |
| | | 2.2 | 50 | 1.20 | 5.9 | neutral |
| | | 2.3 | 50 | 1.50 | 6.3 | neutral |
| | III | 3.1 | 50 | 0.90 | 5.9 | neutral |
| | | 3.2 | 50 | 1.20 | 5.9 | neutral |
| | | 3.3 | 50 | 1.50 | 6.10 | neutral |
| | IV | 4.1 | 60 | 0.70 | 11.5 | anionic |
| | | 4.2 | 60 | 1.00 | 11.8 | anionic |
| | V | 5.1 | 50 | 2.00 | 2.3 | cationic |
| not of the invention | VI | 5.2 | 60 | 2.50 | 2.7 | cationic |
| | VII | 5.3 | 50 | 2.00 | 1.8 | cationic |
| | VIII | 6.1 | 50 | 2.00 | 2.1 | cationic |
| | | 6.2 | 50 | 2.00 | 7.2 | neutral |
| | | 6.3 | 50 | 2.00 | 9.2 | anionic |
| | IX | 6.4 | 50 | 2.00 | 8.8 | anionic |
| | | 6.5 | 50 | 5.00 | 12.7 | anionic |
| | X | 6.6 | 50 | 5.00 | 7.8 | anionic |

COMPOSITION OF THE EMULSIONS AND THEIR CHARGES

2. Behavior of Betaine-Containing Emulsions of the Invention towards Cement Slurries The behavior of the betaine-containing emulsions of the invention towards cement slurries is described in the following tables in which PSZ refers to a rapidly setting, calcium fluoride containing Portland cement and EPZ to a normally setting iron Portland cement.

The setting time is defined as the time within which the cement-bitumen-emulsion-water mixture can be worked. The consistency of the mixture immediately after mixing the components is described in the Consistency column.

| Emulsifier | Formulation | PSZ parts by weight | H₂O parts by weight | Emulsion parts by weight | Setting time in min. | Consistency | EPZ parts by weight | H₂O parts by weight | Emulsion parts by weight | Setting time in min. | Consistency |
|---|---|---|---|---|---|---|---|---|---|---|---|
| I | 1.1 | 100 | 30 | 30 | 10 | 3 homogeneous | 100 | 30 | 30 | 90 | 3 |
| | 1.2 | 100 | 30 | 30 | 10 | 4 | 100 | 30 | 30 | 10 | 2 |
| | 1.3 | 100 | 30 | 30 | immediately | 4 | 100 | 30 | 30 | 8 | 1 |
| | 1.4 | 100 | 30 | 50 | 25 | 2 | 100 | 50 | 30 | 240 | 1 |
| | 1.5 | 100 | 30 | 40 | 40 | 2 | 100 | 40 | 30 | 360 | 1 |
| | 1.1* | 50 | 10 | 100 | 20 | 1 | 50 | 10 | 100 | 360–480 | 1 |
| | 1.2* | 50 | 10 | 100 | 15 | 1 | 50 | 10 | 100 | 360–480 | 1 |
| | 1.3* | 50 | 10 | 100 | 240 | 1 | 50 | 10 | 100 | 360–480 | 1 |

-continued

| Emulsifier | Formulation | PSZ parts by weight | H$_2$O parts by weight | Emulsion parts by weight | Setting time in min. | Consistency | EPZ parts by weight | H$_2$O parts by weight | Emulsion parts by weight | Setting time in min. | Consistency |
|---|---|---|---|---|---|---|---|---|---|---|---|
| according to invention | 1.4* | 50 | 10 | 100 | immediately | 4 | 50 | 10. | 100 | 240–360 | 1 |
| | 1.5* | 50 | 10 | 100 | 20 | 1 | 50 | 10 | 100 | 360–480 | 1 |
| II | 2.1 | 100 | 40 | 30 | 15 | 3 | 100 | 40 | 30 | 25 | 2 |
| | 2.2 | 100 | 40 | 30 | 40 | 2 | 100 | 40 | 30 | 90 | |
| | 2.3 | 100 | 40 | 30 | 55 | 1 | 100 | 40 | 30 | >400 | 1 |
| | | | | | homogeneous | | | | | | homogeneous |
| III | 3.1 | 100 | 40 | 30 | 10 | 3 | 100 | 40 | 30 | 20 | 2 |
| | 3.2 | 100 | 40 | 30 | 20 | 2 | 100 | 40 | 30 | 120 | 1 |
| | 3.3 | 100 | 40 | 30 | 60 | 1 | 100 | 40 | 30 | 300 | 1 |
| IV | 4.1 | 100 | 40 | 30 | — | 4 | 100 | 40 | 30 | — | 4 |
| | 4.2 | 100 | 40 | 30 | — | 4 | 100 | 30 | 30 | 60 | 3 |
| V | 5.1 | 100 | 30 | 30 | 10 | 3 | | | | | |
| | | | | | | inhomogeneous | | | | | inhomogeneous |
| not according to invention VI | 5.2 | 100 | 40 | 30 | — | 4 | 100 | 40 | 30 | — | 4 |
| VII | 5.3 | 100 | 30 | 30 | 5–10 | 3 | 100 | 30 | 30 | 150 | 3 |
| | | | | | inhomogeneous | | | | | | inhomogeneous |
| VIII | 6.1 | 100 | 30 | 30 | 10 | 2 | 100 | 30 | 30 | 180 | 3 |
| | 6.2 | 100 | 30 | 30 | 10 | 3 | 100 | 30 | 30 | 360 | 3 |
| | 6.3 | 100 | 30 | 30 | 10 | 2 | 100 | 30 | 30 | 300 | 3 |
| IX | 6.4 | 100 | 30 | 30 | 10 | 3 | 100 | 30 | 30 | 10 | 3 |
| | 6.5 | 100 | 30 | 30 | 10 | 3 | 100 | 30 | 30 | 5 | 4 |
| X | 6.6 | 50 | 10 | 100 | 60 | 3 | 50 | 10 | 100 | 240 | 3 |

Evaluation of Consistency:
(A) 1 = watery 2 = viscous, still pourable, 3 = very viscous, still spreadable 4 = stiff, can no longer be worked
(B) homogeneous inhomogenous It can be seen from the tables that, only when using the inventive emulsions of bituminous products which contain surface-active betaines as emulsifiers, can a wide range of setting times be predetermined as a function of the concentration of the emulsifier, the pH of the emulsion and the amount of the emulsion.

3. External Evaluation of Molded Articles Bonded with Hardened Binding Agents The envelopment of the cement is evaluated optically according to the brown or gray coloration of the cement after drying. The extent to which cement particles are enveloped by individual bitumen droplets is a measure of the wetting action and of the improvement in adhesion brought about by the emulsifier. An intensive brown coloration indicates good wetting, a corresponding stability of the bitumen emulsion and cement compatibility. If the emulsion breaks on addition of the cement-water mixture, the bitumen droplets and the cement particles will lie next to one another and there is no envelopment of the cement particles. Optically, the mixture then has a gray appearance and the cement acts as a matrix, enclosing the bitumen particles.

| Emulsifier | Formulation | Mixtures with PSZ | | Mixtures with EPZ | |
|---|---|---|---|---|---|
| | | Envelopment of cement particles | Color | Envelopment of cement particles | Color |
| I | 1.1 | uniform | brown coloration | uniform | intensive brown coloration |
| | 1.2 | uniform | brown coloration | uniform | intensive brown coloration |
| | 1.3 | still uniform | dark, brown coloration | uniform | intensive brown coloration |
| | 1.4 | uniform | brown coloration | uniform | intensive brown coloration |
| according to invention | 1.5 | uniform | brown coloration | uniform | intensive brown coloration |
| | 1.1* | | | | |
| | 1.2* | in all cases | black-brown | in all cases | black-brown |
| | 1.3* | uniform good | to | uniform, good | to |
| | 1.4* | envelopment | black | envelopment | black |
| | 1.5* | | | | |
| II | 2.1 | uniform | ocher to brown coloration | uniform | brown coloration |
| | 2.2 | uniform | ocher to brown coloration | uniform | brown coloration |
| | 2.3 | uniform | ocher to brown coloration | uniform | brown coloration |
| III | 3.1 | good, uniform | dark brown coloration | uniform | intensive brown coloration |
| | 3.2 | good, uniform | brown coloration | uniform | intensive brown coloration |
| inventive | 3.3 | good, uniform | brown coloration | uniform | intensive brown coloration |

-continued

| Emulsifier | | Formulation | Mixtures with PSZ | | Mixtures with EPZ | |
|---|---|---|---|---|---|---|
| | | | Envelopment of cement particles | Color | Envelopment of cement particles | Color |
| not according to invention | IV | 4.1 | no envelopment possible | gray coloration | no envelopment possible | gray coloration |
| | | 4.2 | no envelopment possible | gray coloration | no envelopment possible | gray coloration |
| | V | 5.1 | poor envelopment | gray coloration | poor envelopment | gray coloration |
| | VI | 5.2 | no envelopment possible | gray coloration | no envelopment possible | gray coloration |
| | VII | 5.3 | poor envelopment | gray coloration | poor envelopment | gray coloration |
| | VIII | 6.1 | poor envelopment | gray coloration | poor envelopment | gray-brown coloration |
| | | 6.2 | poor envelopment | light brown coloration | poor envelopment | gray-brown coloration |
| | | 6.3 | partial envelopment | heterogeneous brown coloration | poor envelopment | gray coloration |
| not inventive | IX | 6.4 | satisfactory envelopment | gray-brown coloration | satisfactory envelopment | gray-brown coloration |
| | | 6.5 | satisfactory envelopment | gray-brown coloration | satisfactory envelopment | gray-brown coloration |
| | X | 6.6 | good envelopment | dull dark brown | good envelopment | dull dark brown |

It turns out that only the inventive emulsions have the combination of properties of variable processing time and good envelopment of the cement particles.

4. Examples of the Use of Emulsions in Accordance with the Present Invention (a) Mortar for filling the spaces below concrete slabs
In the mixing through of a mortar pump
66 kg of spherical sand 0/2
66 kg of crushed sand 0/3
66 kg of Portland cement 450 F
are mixed intimately and subsequently, while continuing the mixing,
18 kg of water and
90 kg of the inventive bitumen emulsion
are added.

The inventive bitumen emulsion is prepared by emulsifying
65 weight % of bitumen with a penetration of 65 in
35 weight % of water,
which contains
1.0 weight % of emulsifier I and
0.3 weight % of 45% KOH.

The finished mixture may be utilized by pumping it underneath concrete slabs of concrete streets which, because of the buffeting by heavy traffic, are no longer resting adequately on the roadbed. The mixture commences to set after about 1 hour and reaches compression strengths of 5–10 kg/cm² within 24 hours and 20–40 kg/cm² within 30 days. The compression strength is measured on cylindrical samples of 5 cm diameter and 5 cm height at a 20 mm/min rate of advance of the piston ram.

(b) Cold-cast floor finish
70 kg of moraine gravel 2/5
70 kg of crushed moraine sand 0/3
22 kg of Portland cement PZ 250
are intimately mixed in a cyclo mixer and
5–15 kg of water (depending on the moisture of the mineral mixture) and
32 kg of the inventive bitumen emulsion
are then added.

The inventive bitumen emulsion is prepared by emulsifying
65 weight % of bitumen with a penetration of 80 in
35 weight % of water,
which contains
1.0 weight % of emulsifier I and
0.3 weight % of 45% KOH.

Within 30 minutes, the finished mixture is spread as a 2.5 cm thick floor-finish coating on a base of lean concrete. Depending on the temperature, the first smoothing is carried out after about 3 hours and the second after about 24 hours. When fully hardened, the floor is indented 2.5 mm at 20° C. under a load of 10 kg/cm² for 5 hours.

(c) Emulsion bonded gravel support layer
A gravel-sand mixture, consisting of
20 weight % of spherical sand 0/2
50 weight % of spherical gravel up to 20 mm
30 weight % of crushed gravel
is mixed in the moist state (2–4 weight % of water) with
5 weight % of Portland cement PZ 350 and
6 weight % of the bitumen emulsion of Example 1.

The mixture is spread on the prepared roadway as a 15 cm layer by means of a grader or a finisher and is then consolidated by rollers. The road can then be finished in concrete as well as in asphalt-concrete.

(d) Material for the manufacture of cast, shaped articles, such as, slabs or composite stone
In a concrete mixer, 69.6 weight % of an aggregate consisting of

| | |
|---|---|
| spherical gravel 5/8 mm | 68.0 weight % |
| spherical gravel 2/5 mm | 2.0 weight % |
| spherical sand 0.71/2 mm | 18.0 weight % |
| spherical sand 0.09/0.71 mm | 6.0 weight % |
| filler less than 0.09 mm | 6.0 weight % |
| | 100.0 weight % | are premixed with 17.08 weight % of PSZ. 10.7 weight % of water and finally 1.9 weight % of the bitumen emulsion of the present invention are then added. The bitumen emulsion contains 60 weight % of bitumen and 1.4 weight % of emulsifier II. The mixture is cast into molds which had been sprayed with a release agent; the molded articles can be removed from the mold after 2 hours.

What is claimed is:

1. Hardenable binding agents comprising cement and emulsions of bituminous products, said emulsions containing surface-active betaines as the emulsifiers.

2. The binding agents of claim 1 wherein the betaine has the formula:

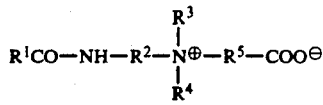

in which
- $R^1$ is an aliphatic hydrocarbon residue with 8 to 22 carbon atoms or a cycloaliphatic hydrocarbon residue,
- $R^2$ is a bivalent hydrocarbon residue with 2 to 6 carbon atoms,
- $R^3$ and $R^4$ are the same or different and may be a monovalent hydrocarbon residue with 1 to 4 carbon atoms, and
- $R^5$ is a bivalent hydrocarbon residue with 1 to 4 carbon atoms.

3. The agents of claim 1 wherein the betaines have the formula

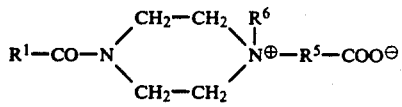

in which
- $R^1$ is an aliphatic hydrocarbon residue with 8 to 22 carbon atoms or a cycloaliphatic hydrocarbon residue,
- $R^5$ is a bivalent hydrocarbon residue with 1 to 4 carbon atoms, and
- $R^6$ is a monovalent hydrocarbon residue with 1 to 4 carbon atoms.

4. The agents of claim 1 wherein the betaines have the formula

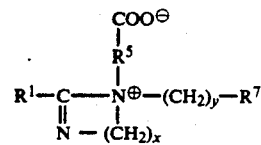

in which
- $R^1$ is an aliphatic hydrocarbon residue with 8 to 22 carbon atoms or a cycloaliphatic hydrocarbon residue,
- $R^5$ is a bivalent hydrocarbon residue with 1 to 4 carbon atoms,
- $R^7$ is a hydrogen, alkyl or hydroxyl residue,
- $x$ is 2 or 3, and
- $y$ is 1 or 2.

5. The agents of claims 1, 2, 3, or 4 wherein the bitumen content of the emulsion is between about 30 to 70 weight percent based on the total weight of the emulsion.

6. The agents of claims 1, 2, 3 or 4, wherein the emulsifier content of the emulsion is between about 0.2 to 5 weight percent of the total emulsion.

7. The agents of claims 1, 2, 3 or 4, wherein the pH of the emulsion is between about 1.5 and 10.

8. The agent of claim 2 wherein $R^2$ is linear.

9. The agent of claim 2 wherein $R^3$ and $R^4$ are methyl.

10. The agents of claims 2, 3, or 4 wherein $R^5$ is methylene or ethylene.

11. A hardened slab formed from the agents of claim 1.

12. A shaped article formed from the composition of claim 1.